United States Patent
Senior, Jr. et al.

(10) Patent No.: US 6,401,868 B1
(45) Date of Patent: Jun. 11, 2002

(54) DEVICE AND METHOD FOR REMOVING OIL USED TO LUBRICATE VERTICAL TURBINE PUMPS

(76) Inventors: Roy F. Senior, Jr., 4545 E. Lincoln, Fresno, CA (US) 93725; Jeffrey G. Vincent, 1411 N. Whitney, Fresno, CA (US) 93703

( * ) Notice: Subject to any disclaimer, the term of this patent is extended or adjusted under 35 U.S.C. 154(b) by 0 days.

(21) Appl. No.: 09/597,730

(22) Filed: Jun. 19, 2000

Related U.S. Application Data

(60) Provisional application No. 60/147,197, filed on Aug. 2, 1999.

(51) Int. Cl.[7] ................................................ F01M 1/00
(52) U.S. Cl. ........................ 184/6.18; 184/7.1; 166/319
(58) Field of Search ................................ 184/6.18, 7.1, 184/13.1, 26; 166/105, 319, 373, 374

(56) References Cited

U.S. PATENT DOCUMENTS

| | | | |
|---|---|---|---|
| 3,599,590 A | | 8/1971 | Rego |
| 3,849,311 A | | 11/1974 | Jakubek |
| 4,062,406 A | * | 12/1977 | Akkerman et al. ......... 166/323 |
| 4,171,932 A | | 10/1979 | Miller |
| 4,177,021 A | | 12/1979 | Niedermeyer |
| 4,197,879 A | * | 4/1980 | Young ........................ 137/629 |
| 4,273,650 A | | 6/1981 | Solomon |
| 4,476,933 A | * | 10/1984 | Brooks ........................ 166/324 |
| D283,225 S | | 4/1986 | Canvasser |
| 4,934,458 A | | 6/1990 | Warburton et al. |
| 5,147,559 A | | 9/1992 | Brohpey et al. |
| 5,474,685 A | | 12/1995 | Breslin |
| 5,509,481 A | * | 4/1996 | Huber et al. ................ 166/297 |
| 5,564,904 A | | 10/1996 | Heckman |

FOREIGN PATENT DOCUMENTS

| | | |
|---|---|---|
| WO | WO82/00710 | 3/1982 |
| WO | WO91/00765 | 1/1991 |

* cited by examiner

*Primary Examiner*—David Fenstermacher
(74) *Attorney, Agent, or Firm*—Charles E. Cates; Elizabeth A. Dawn

(57) ABSTRACT

The lubricating oil removal device and method of the present invention provides a device for intercepting the oil used to lubricate the line shaft bearings of an oil lubricated turbine pump before the oil can contaminate the water. Holes are provided in the oil tube below the bottom bearing to be lubricated and above the relief ports typically provided in the bowl assembly. An annular relief collar is provided around the oil tube at the location of the holes. A drainage pipe allows oil to flow from the relief collar to a reservoir located on the outside of the column pipe. A pump located within the reservoir lifts oil from the reservoir, through a tube, and onto the surface for reuse or disposal.

11 Claims, 3 Drawing Sheets

DEVICE AND METHOD FOR REMOVING OIL USED TO LUBRICATE VERTICAL TURBINE PUMPS

This Non-Provisional Application claims the benefit of U.S. Provisional Application Ser. No. 60/147,197 filed on Aug. 2, 1999.

This invention relates to a method and apparatus for removing oil used to lubricate a vertical turbine pump from the oil tube at or near the bottom line shaft bearing to be lubricated and before the oil can exit the oil tube through a relief port provided in the bowl assembly. In this way, lubricating oil is prevented from contacting the water to be pumped.

BACKGROUND OF THE INVENTION

In a conventional water well, the well borehole is drilled down some distance into a water-bearing formation. A well screen for receiving water is then positioned within the water-bearing formation. A non-porous pump casing is attached to the well screen. The pump casing extends from the well screen to the discharge head at the well's surface. The pump bowl assembly with impellers for lifting water is typically located just above the well screen in the pump column. In order to enter the bowl assembly and be pumped to the surface, water must enter the well through the well screen and then rise to the pump bowl.

When no water is being pumped from the well, water in the well stands at the static water level. When water is being pumped from the well, the water level is lowered to the pumping water level. At the pumping water level, the water level must still be high enough so that the pump bowl is submerged. A pump can only function properly so long as there is sufficient water to cover the pump bowl.

Oil used to lubricate the line shaft bearings is continuously dripped into the oil tube from an oil reservoir located on the pump head. The oil from the reservoir travels down the oil tube lubricating the line shaft bearings and exits through a relief port in the bowl assembly. When water rises into the bowl assembly from a well screen located below the bowl, oil from the relief port floats to the surface of the water in the pump column. Because the density of the lubricating oil is less than the density of the water, the oil forms a floating layer on top of the water outside the pump column and inside the well casing.

A problem has developed in many deep production wells in which the static water level has been lowered by several hundred feet. The decrease in static water level may be the result of several factors; however, continuous water mining in the area is generally considered to be the primary cause. When the static water level is lowered, the pump bowl assembly must also be lowered in order to gain sufficient submergence to operate the well. In order to gain the requisite submergence, the pump bowl must frequently be lowered into the well screen by adding pump column, oil tube shaft, and bowl stages. Sometimes the pump bowl must be lowered several hundred feet into the well screen. When the pump bowl assembly is lowered into the well screen, the water being pumped by the well no longer rises into the pump bowl through the pump column. Instead, when the pump bowl is positioned within the well screen, water enters the pump bowl from the bottom, top, and sides. When water enters the pump from above the bowl assembly, it creates a downward flow of water past the bowl assembly and into the pump intake at the bottom of the bowl assembly. Oil from the oil tube exiting through the relief ports is caught up in the downward flow of water passing the ports. Consequently, the oil becomes mixed into the water to be pumped when it joins the downward movement of water into the pump intake. The oil is then lifted along with the water to the surface by the pump's impellers. As a result, the water produced by a well can become contaminated by the oil used to lubricate the line shaft bearings. The use of food grade oil to lubricate the pump creates particular problems as food grade oil provides an excellent medium for bacteria growth in water delivery systems and storage tanks.

SUMMARY OF THE INVENTION

The lubricating oil removal assembly of the present invention provides a means for intercepting the oil used to lubricate the line shaft bearings before the oil can enter the pump. In my invention, holes are provided in the oil tube below the bottom bearing to be lubricated and above the relief ports typically provided in the bowl assembly. An annular relief collar is then provided around the oil tube at the location of the holes. A drainage pipe allows oil to flow from the relief collar to a reservoir located on the outside of the column pipe. A pump located within the reservoir lifts oil from the reservoir, through a tube, and onto the surface for reuse or disposal. Thus, lubricating oil is prevented from ever coming into contact with the well water. In the preferred embodiment of the invention, the oil tube with holes and annular collar together with the associated drainage pipe, oil reservoir and pump are manufactured as separate component parts which are joined with the column pipe and oil tube of the existing prior art pump structure.

DETAILED DESCRIPTION OF THE DRAWINGS

Figure 1:
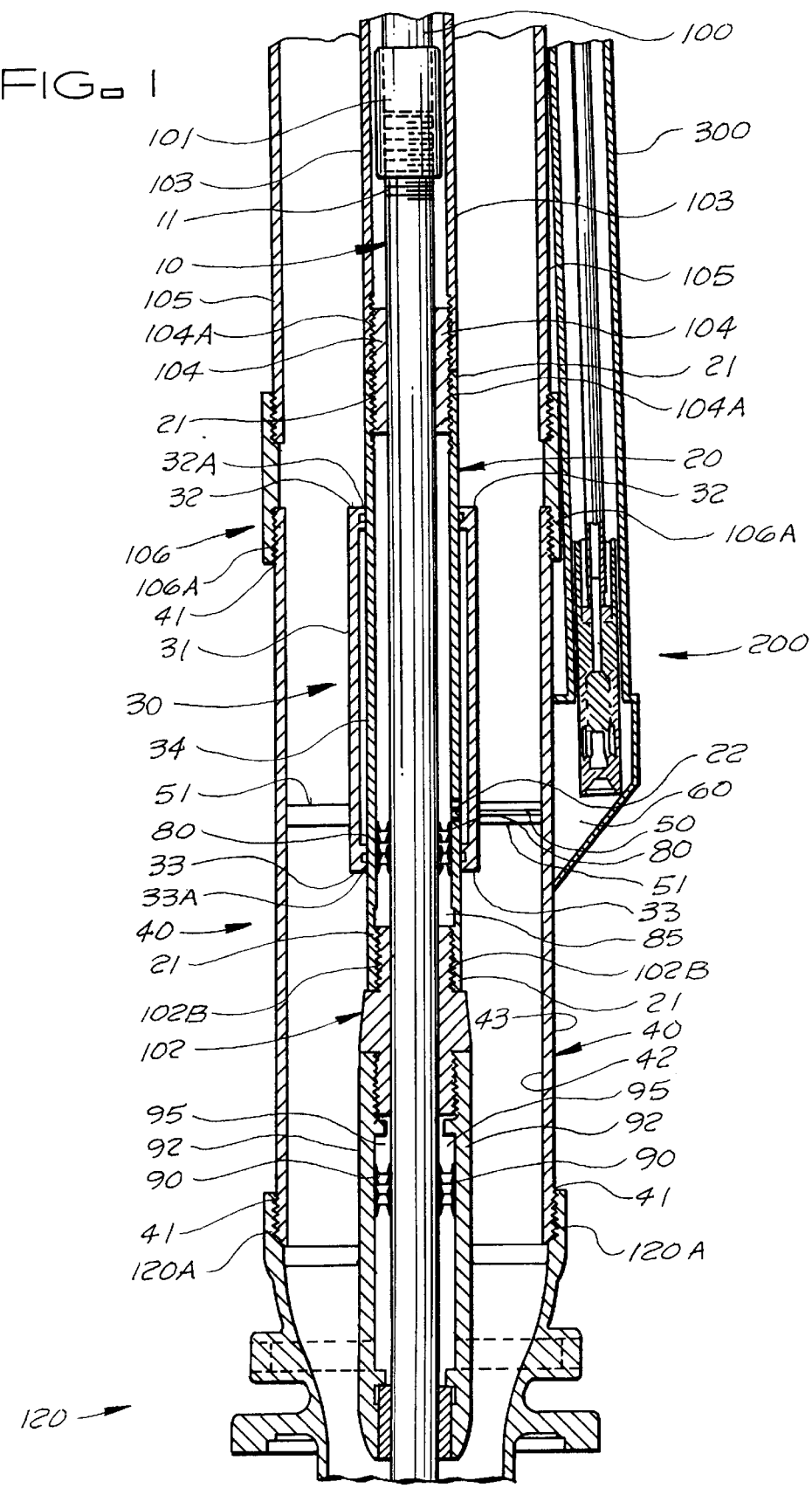
FIG. 1 is a longitudinal sectional view showing the present invention.

The lubricating oil removal assembly of the present invention includes new bowl shaft segment 10, new oil tube segment 20, annular relief collar 30, new pump column segment 40, drainage pipe 50, oil reservoir 60, and pollutant pump 200.

New bowl shaft segment 10 is cylindrical in shape and sized to match lineshaft 100 of the pump. Bowl shaft segment 10 abuts lineshaft 100 of the existing prior art pump structure at lineshaft coupler 101, the coupler nearest the discharge case 120 of the pump bowl. Bowl shaft segment 10 is provided with threads 11 at one end. Threads 11 engage with the lineshaft coupler 101. At the opposite end, bowl shaft segment 10 extends through the total bowl assembly.

New oil tube segment 20 is a hollow cylindrical wall sized to match oil tube 103 of the existing prior art pump structure. Oil tube segment 20 abuts oil tube 103 at last lineshaft bearing 104, which is the lineshaft bearing nearest the discharge case 120. Oil tube segment 20 is provided with threads 21 at either end. On one end, threads 21 engage with threads 104A on the exterior surface of the lineshaft bearing 104. At the opposite end of the oil tube segment 20, threads 21 engage with exterior threads 102B on the exterior surface of the bowl adapter bearing 102 of the pump bowl. Oil tube segment 20 is provided with oil drainage openings 22. In order to provide adequate lubrication of the lineshaft bearings within the oil tube, openings 22 should be positioned in oil tube segment 20 below last lineshaft bearing 104.

Annular relief collar 30 is fitted about oil tube segment 20 so that openings 22 open into collar 30. Annular relief collar 30 includes outer wall 31, top 32, bottom 33, and annular cavity 34. Top 32 and bottom 33 extend from outer wall 31 toward oil tube 20. Oil tube 20 passes through central opening 32A in top 32 and central opening 33A in bottom 33. Openings 32A and 33A should be sized so that they fit closely about oil tube 20. The space between 32A and oil tube 20 is sealed with an O-ring. The space between 33A and oil tube 20 is similarly sealed with an O-ring. The O-rings prevent oil from passing between openings 32A and 33A and oil tube 20.

Lip seals 80 are provided between bowl shaft segment 10 and oil tube segment 20 immediately below openings 22 in oil tube segment 20. Lip seals 80 seal the space between bowl shaft segment 10 and oil tube segment 20 so that oil may not pass the seal. Lip seals 80 include three lip seals oriented upward to prevent the lubricating oil in oil tube segment 20 from flowing further down the lineshaft toward bowl adapter bearing 102. Lip seals 80 further include one lip seal oriented toward the discharge case. The lip seal nearest the bowl adapter bearing 102 of the pump bowl is oriented toward the discharge case to keep the grease in grease pack area 85 from passing through seals 80 and contaminating openings 22 and pump 200.

Lip seals 90 are provided in discharge case 120 between wall 92 of the discharge case and the bowl shaft. Lip seals 90 prevent water from entering bowl adapter bearing 102. Lip seals 90 also prevent the grease from grease pack 95 from traveling down the bowl shaft and into the pump water. Lip seals 90 included one lip seal oriented upward, which prevents the grease from grease pack 95 from flowing down the bowl shaft into the pump water. Lip seals 90 further include three lip seals oriented toward the discharge case, which keep water from traveling up the bowl shaft and into bowl adapter bearing 102.

Annular relief collar 30 is held in position about oil tube segment 20 by legs 51 extending between collar 30 and new column segment 40. Column segment 40 has interior surface 42 and exterior surface 43. It is preferred that at least three legs be used to support collar 40 in position about oil tube segment 20. Column segment 40 is a hollow cylindrical wall sized to match pump column 105 of the existing prior art pump structure. Column segment 40 abuts pump column 105 at coupler 106. Column segment 40 is provided with threads 41 at either end. On one end, threads 41 engage with threads 106A on the interior surface of coupler 106. At the opposite end of column segment 40, threads 41 engage with interior threads 120A on the upper interior surface of the discharge case 120.

In the preferred embodiment of the invention, oil receiving reservoir 60 is mounted to exterior surface 43 of column 40. Oil drainage pipe 50 communicates between annular relief collar 30 and oil receiving reservoir 60. Preferably, pipe 50 passes from annular relief collar 30, through one of legs 51, and into oil receiving reservoir 60.

Figure 2:
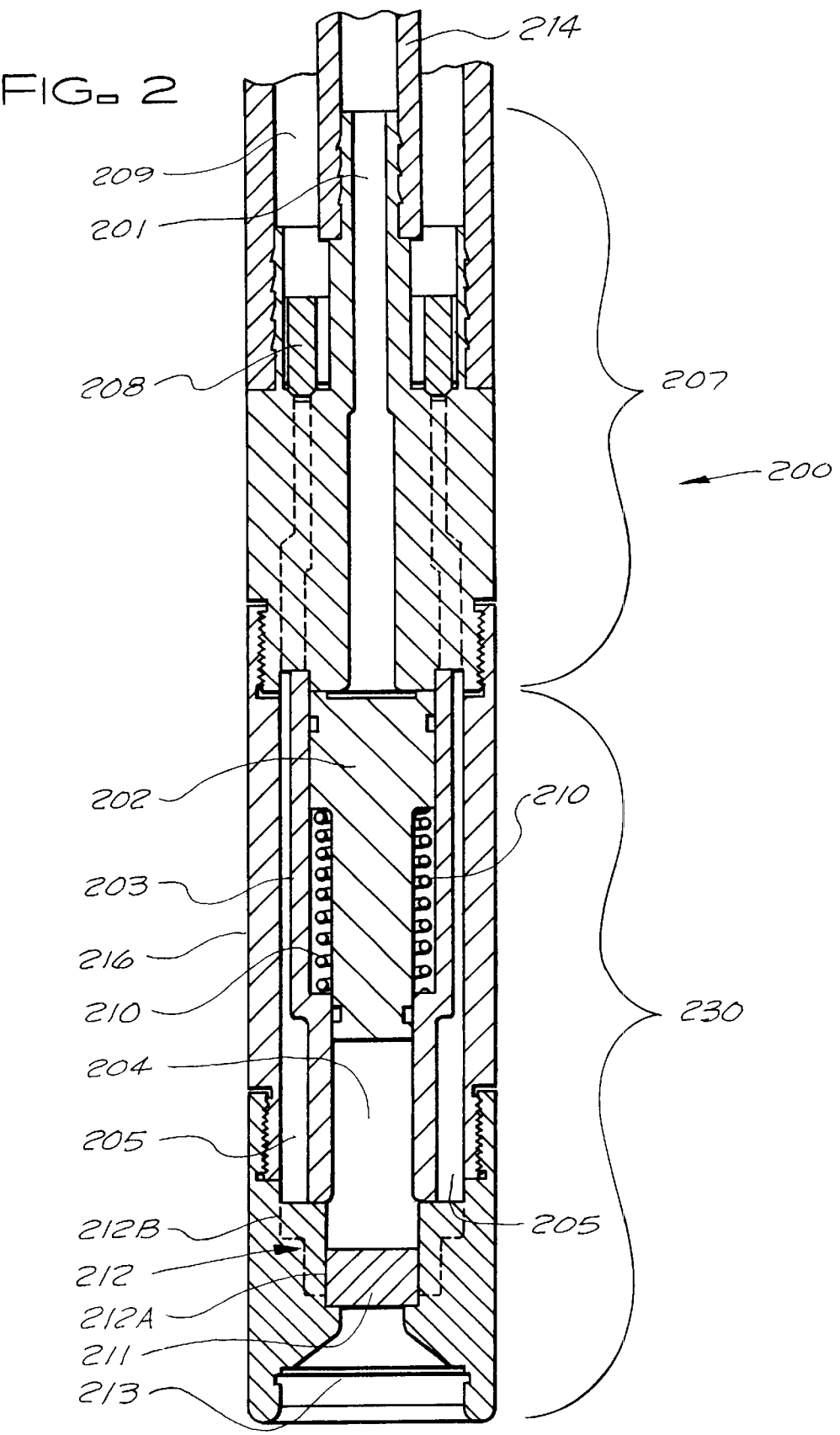
FIG. 2 is a longitudinal sectional view of the pollutant pump of the present invention.

As shown in FIGS. 1 and 2, air actuated pollutant pump 200 is located within reservoir 60 and is generally cylindrical in shape. As shown most clearly in FIG. 2, pump 200 comprises top body 207 and lower body 230, which includes sleeve 216, piston sleeve 203, piston 202, and inlet 212. Oil from reservoir 60 enters pump 200 through screen 213 of inlet 212, which has narrower portion 212A and wider portion 212B. Inlet disc 211 is positioned within inlet 212 and selectively allows oil into oil chamber 204. In the pump's resting position, piston 202 is held in position above oil chamber 204 by compression spring 210, and disc 211 is positioned in narrower portion 212A of inlet 212. Disc 211 has a specific density such that it sinks in the oil in oil chamber 204 into the lowest part of inlet 212.

When disc 211 is lifted so that it is positioned in wider portion 212B of inlet 212 and does not plug inlet 212, oil may flow through inlet screen 213, through inlet 212, around disc 211 and into oil chamber 204. Oil chamber 204 communicates with fluid transfer passage 205. Fluid transfer passage 205 is formed in part by the annular space between piston sleeve 203 and outer sleeve 216 of lower body 230. Fluid transfer passage 205 continues through top body 207 and terminates with outlet check valve 208. Fluid transfer hose 209 is connected with pump 200 at valve 208 so that oil passing through valve 208 enters hose 209. Pneumatic hose 214 is centrically positioned within hose 209 and attaches to pump 200 at air passage 201. Fluid transfer hose 209 should have a larger diameter than pneumatic hose 214 so that hose 214 can be positioned within hose 209 and so that oil can be moved to the surface through the annular space created between hose 209 and hose 214. Air passage 201 communicates between hose 214 and piston 202. It is preferred that pneumatic hose 214 and fluid transfer hose 209 be surrounded by a PVC access housing 300 which extends from reservoir 60 to the surface of the well. The housing protects hoses 209 and 214 and accommodates installation and removal of pollutant pump 200.

In use, air under pressure from pneumatic hose 214 enters air passage 201 and acts against piston 202 causing piston 202 to move away from the source of air under pressure and into oil chamber 204. As piston 202 moves away from the source of air under pressure, spring 210 which holds piston 202 above oil chamber 204 is compressed. As piston 202 displaces oil in chamber 204, the oil within the chamber is pressurized. Due to its weight, disc 211 rests in narrower portion 212A of inlet 212, which plugs the inlet and prevents oil from exiting the through inlet 212. As a result of the increased pressure caused by the movement of piston 202, oil in chamber 204 is forced into fluid transfer passage 205. As piston 202 moves entirely into oil chamber 204, sufficient pressure is created so that oil from chamber 204 is forced through fluid transfer passage 205 and through outlet check valve 208. Valve 208 is a one-way valve which prevents the back-flow of oil into passage 205. Fluid transfer hose 209 is attached to pump 200 at outlet check valve 208 so that oil passing through valve 208 is collected in hose 209. Oil collected in hose 209 is ultimately brought to the surface by subsequent pumping action of piston 202.

Once piston 202 is completely extended into oil chamber 204, the direction of air flow in pneumatic hose 214 is reversed, and air is drawn from air passage 201 so that the rarefaction of air in combination with the return action of compression spring 210 causes piston 202 to return to its resting position above oil chamber 204. As piston 202 is drawn out of oil chamber 204, an area of reduced pressure is created within oil chamber 204 which causes disc 211 to move from narrower portion 212A of inlet 212 into wider portion 212B. When disc 211 moves into wider portion 212B, oil flows around disc 211 and into oil chamber 204. When piston 202 has been completely drawn out of oil chamber 204, oil entering the chamber through inlet 212 equalizes the pressure on both sides of disc 211, and disc 211 once again sinks into narrower portion 212A. The piston cycle may be repeated as often as necessary to pump the oil from reservoir 60 to the surface where the oil is collected for disposal or recycle and reuse.

The duration and direction of air flow into pneumatic hose 214 is controlled by solenoid (not shown) and timer (not shown).

Figure 3:
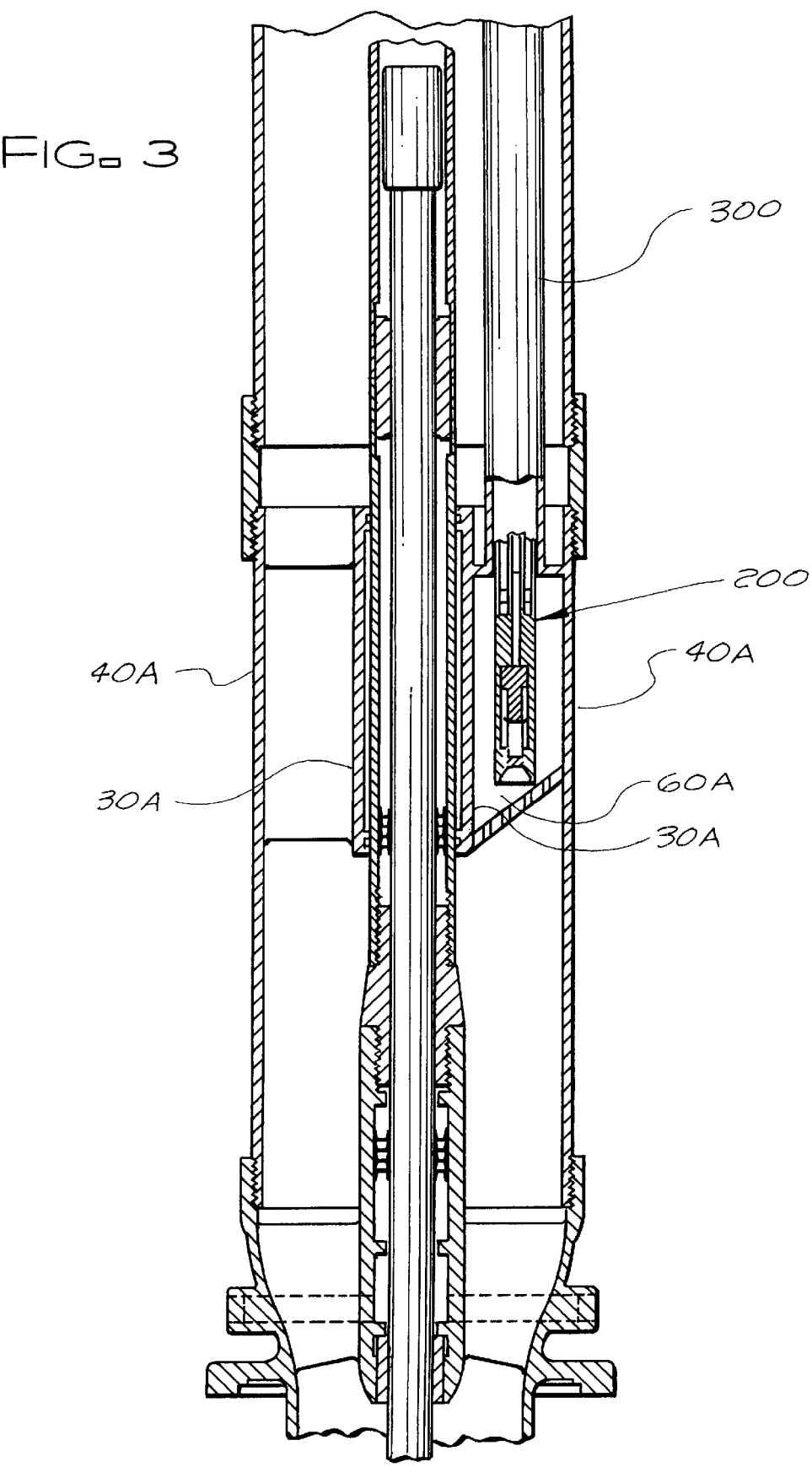
FIG. 3 is a longitudinal sectional view showing an alternative embodiment of the present invention.

In an alternate embodiment of the invention shown in FIG. 3, oil receiving reservoir 60A is positioned immediately adjacent to relief collar 30A. In this embodiment of the invention, relief collar 30A forms one longitudinal wall of reservoir 60A and column segment 40A forms the other longitudinal wall of the reservoir. Pollutant pump 200 is positioned within reservoir 60A and actuated as has been described above.

We claim:

1. A method for intercepting and removing the oil used to lubricate the lineshaft bearings of an oil lubricated water turbine pump before the oil can contaminate the water, said method comprising the steps of:
    a. providing a means for causing the oil used to lubricate said lineshaft bearings to exit the oil tube at a point below the lineshaft bearings and above the relief ports in the discharge case of the pump bowl;
    b. providing a means for collecting said oil used to lubricate said lineshaft bearings once said oil has exited said oil tube; and
    c. providing a means for transferring said oil from said means for collecting to the surface of the well.

2. The method of claim 1 wherein said means for removing said oil used to lubricate said lineshaft bearings comprises providing a new oil tube segment for attachment to the oil tube of the existing pump structure, said new oil tube segment being provided with oil drainage openings, said openings being positioned in the said new oil tube segment so that the oil flowing through said existing oil tube and said new oil tube segment must flow by all lineshaft bearings before exiting said new oil tube segment through said openings.

3. The method of claim 2 wherein said means for collecting said oil used to lubricate said lineshaft bearings comprises:
    a. providing an annular relief collar about said new oil tube segment, said collar being positioned about said new oil tube segment so that said oil drainage openings open into said collar;
    b. providing a new pump column segment for attachment to the pump column segment of the existing pump structure, said new pump column segment being cylindrical in shape and having an interior and exterior surface, said new pump column segment being provided with legs which extend between said new pump column segment and said annular relief collar, said legs supporting said relief collar position about said new oil tube segment.
    c. providing a pipe means for draining the oil from said collar into a reservoir, said reservoir being attached to said exterior surface of said new pump column segment.

4. The method of claim 3 wherein said means for transferring said oil from said means for collecting to the surface of the well comprises providing a pump means within said reservoir.

5. The method of claim 4 wherein said pump means comprises:
    a. an outer sleeve;
    b. an inner sleeve positioned within said outer sleeve;
    c. a movable piston positioned within said inner sleeve, said inner sleeve being connected to a source of fluid under pressure;
    d. means for directing said fluid under pressure to one side of said piston and thereby causing movement of said piston;
    e. a chamber with an inlet for receiving oil, said chamber positioned so that when said fluid under pressure is directed to one side of said piston, said piston moves into said chamber;
    f. a passage communicating between said chamber and a hose for transferring oil to said surface of said well; and
    g. means for causing said piston to move out of said chamber.

6. The method of claim 5 wherein said means for causing said piston to move out of said chamber are spring means.

7. The method of claim 6 wherein said means for causing said piston to move out of said chamber further include a means for reducing the fluid pressure on one side of the piston causing the piston to move out of said chamber.

8. The method of claim 5 wherein said inlet is provided with a means positioned within said inlet for selectively permitting oil to enter said chamber.

9. The method of claim 8 wherein the specific density of said means for selectively permitting oil to enter said chamber is such that said means will sink in said oil used to lubricate said lineshaft.

10. The method of claim 9 wherein the specific density of said means for selectively permitting oil to enter said chamber is such that a reduction in pressure within said chamber caused by the movement of said piston out of said chamber will cause oil to enter said chamber.

11. The method of claim 3 wherein said pipe means for draining said oil into said reservoir passes through the interior of one of said legs extending between said new pump column segment and said annular relief collar.

* * * * *